United States Patent Office 2,960,687
Patented Nov. 15, 1960

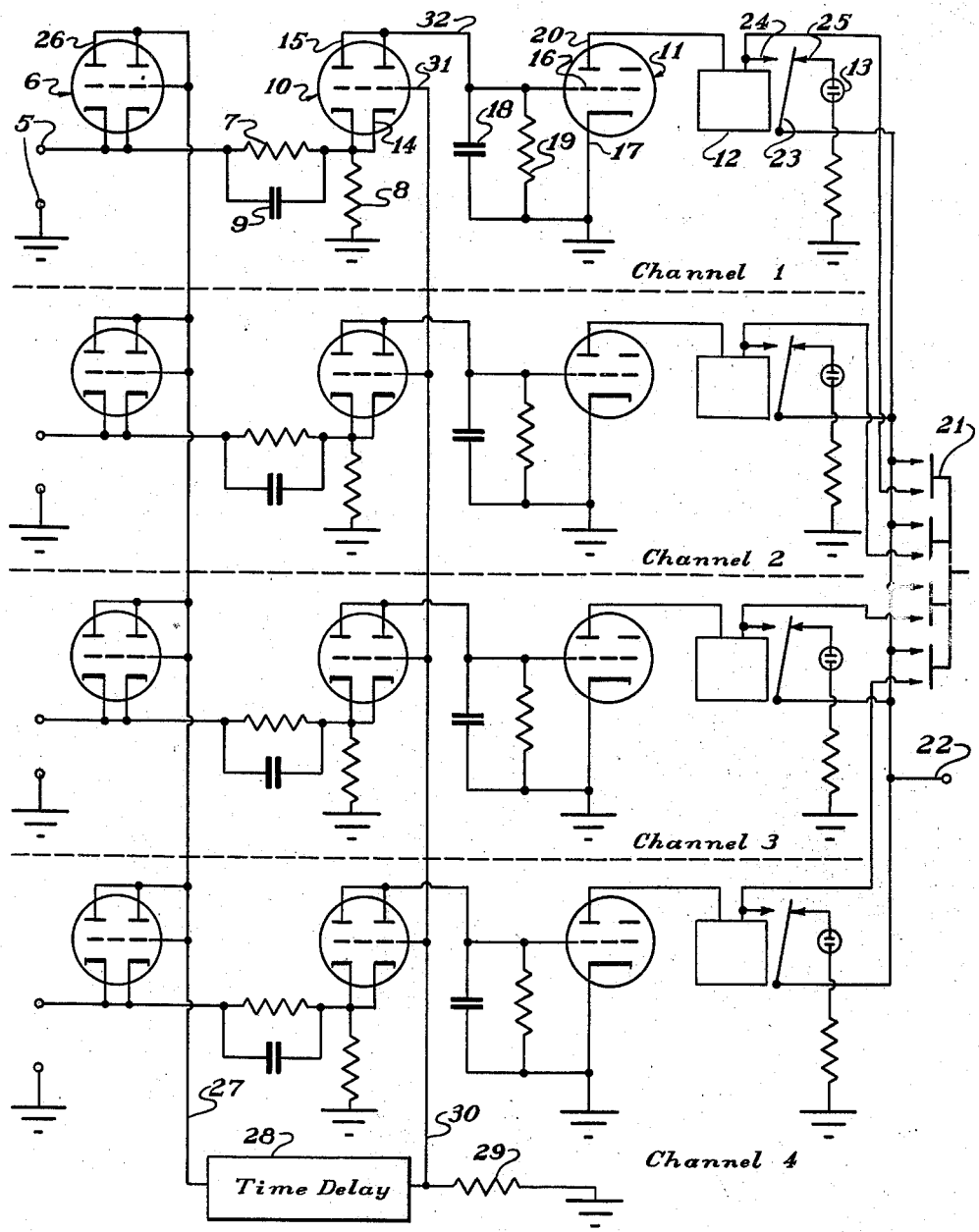

2,960,687

COINCIDENCE OCCURRENCE INDICATOR

Gerson H. Robison, North Merrick, N.Y., and John F. Dickson, Neptune, N.J., assignors to the United States of America as represented by the United States Atomic Energy Commission Filed Oct. 27, 1948, Ser. No. 56,868

8 Claims. (Cl. 340—253)

The present invention relates to indicating systems and more particularly to systems for the indication of the occurrence of events within time intervals of the order of fractions of a microsecond.

In the operation of many types of precision apparatus it is often desirable to know that certain events are occurring in proper time relationship with one another or are occurring substantially simultaneously, i.e., within time intervals of the order of fractions of a microsecond. The similarity of such a problem to that of the detection and recording of the coincident occurrence of events connected with nuclear phenomena, influenced early systems which followed the pattern presented by coincidence circuits of the Rossi or similar types. A discussion of such circuits appears for example in W. B. Lewis, "Electrical Counting," published by the MacMillan Company, New York in 1943.

However, such circuits or systems were developed for employment under laboratory conditions including, for example, controlled and regulated electrode potentials for the electron discharge devices employed. Furthermore, the resolution time of such systems were not definitely fixed at maximum predetermined limits. In other words, in the operation of such circuits one cannot always say that a plurality of events occurred within a fixed time interval, but only that such events did occur within a time period fixed by the characteristics of circuit components which varied as such components were used.

In addition it should be noted that such systems as have been described in the past cannot be adapted to indicate events evidenced by a high voltage pulse, for example pulse amplitudes of between five hundred and two thousand volts; nor did such prior art systems indicate the non-occurrence of a particular event of a group under observation.

It is thus seen to be an object of the present invention to provide a system for the indication of the occurence of a plurality of events within a predetermined short time interval.

It is a further object of the present invention to provide such a system in which a sensible indication is made of the non-occurrence within the preselected time period of a particular one of the plurality of events under observation.

Another object of the present invention is to provide an indicating system operative to show the occurrence or non-occurrence of a plurality of events within time periods of the order of fractions of a microsecond.

Still another object of the present invention is to provide an electronic indicating system operative to show the occurrence or non-occurrence of a plurality of particular events evidenced by high voltage pulses, within predetermined short time periods, independently of variable characteristics of the components of the system.

Other objects and advantages of the invention will be apparent to one skilled in the art from the following description of the general principles involved and of a presently preferred embodiment.

In general, the above objects are attained by providing a plurality of electronic channels each having an input circuit, an output circuit including sensible indicating means and control means connected therebetween responsive to a predetermined signal to prevent activation of said output circuit, and circuit means including delay means associating all of said input circuits and all said control means and adapted to derive a signal from at least the first input pulse and pass the same to said control means.

In order to increase the understanding of the present invention reference is made to the drawing, made part of this specification, in which the single figure is a schematic diagram of a presently preferred embodiment. Referring to the drawing, it is seen that a plurality of identical channels are provided. The number of channels employed, of course, may be varied.

For the purposes of the present description, four channels are shown, and similar parts in each of the channels will be deemed referred to by the reference numeral applied to the particular element in the description of channel 1.

The channel is provided with input terminals 5 which are directly connected to an input electron discharge device 6 and through an attenuating network including resistors 7 and 8 and condenser 9 to a control electron discharge device 10. Input device 6 is shown in the drawing as a dual triode, but it will be noted that the grid electrodes and anodes thereof are directly connected as are the cathodes so that the function of the said device 6 is essentially as a diode. Device 10 is connected in series between the input terminal 5 and an output circuit including electron discharge device 11, relay 12, and neon indicator 13. The input pulse, after being attenuated in the RC network heretofore described, is applied to the cathode 14 of control device 10 and, when conditions are favorable, appears as a suitable pulse on the anode 15 and is passed directly to the grid electrode 16 of output device 11 through the connection provided between said anode and said grid. Cathode 17 is grounded. Condenser 18 and resistor 19 are provided between grid 16 and cathode 17 so that a pulse appearing on anode 15 of device 10 is integrated in capacitor 18 and bleeds off through resistor 19 with a time constant established by the values of said capacitor and resistor, thus impressing upon grid 16 a broadened version of the pulse appearing at the said anode 15. Suitable heaters for said tube 11 and means for energizing the same are provided but not shown.

Anode 20 of device 11 is connected to one end of the coil winding of relay 12, the other end of said winding being connected through the normally open reset switch 21 to a source of direct current potential indicated by conductor 22. Relay 12 is of the two position type and has its movable arm 23 directly connected to conductor 22. In one position, said movable arm is in contact with contact point 24 which is directly connected to the coil winding of said relay 12 and hence is connected to anode 20 of device 11. In the other position, arm 23 is in contact with contact point 25 and thus permits current flow through neon indicator 13.

The anodes 26 of each of the input devices 6 in the respective channels 1 through 4, are connected together by conductor 27 and therethrough to one end of the delay line 28 which is characterized by a predetermined delay time to fit the resolving time requirement imposed on the system. The other end of the said delay line 28 is connected through resistor 29 to ground and through conductor 30 to the grids of the control tubes 10 in each of the said channels.

It is a feature of the present invention that no anode or grid potentials are supplied from independent sources to electron discharge devices 6 and 10 in any of the channels. Necessary filament potentials for filaments (not shown in the drawing) of devices 6 and 10 are derived from suitable sources, also not shown. It is preferable to supply heater potential to these filaments in each channel from an individual, low capacity, high voltage insulation, transformer in order to decrease the possibility of filament to cathode breakdown, and also to eliminate inter-channel coupling.

The operation of the four channel system described above is somewhat as follows. Input pulses derived from the events under observation and having a voltage amplitude of between 500 and 2000 volts, negative with respect to ground are applied to the respective channels. These input pulses are applied to input devices 6 and control devices 10 in the manner mentioned above. More particularly, the full input voltage of each channel is applied to the cathode of the input diode 6 and this same input pulse voltage is attenuated by the compensated network including resistors 7 and 8 and capacitors 9 and applied to cathode 14 of control devices 10. The input voltage applied to the said control devices is attenuated through said network in order that the control grid voltage (received from input device 6 as will be seen later) will always be sufficient to cut the said control devices off on a rapidly rising portion of the pulses supplied to the grid 31 of the said control devices. Such attenuation must be carefully adjusted in order to afford as much ultimate plate voltage for the said control devices 10 as is possible under the circumstances while avoiding the loss of control by the said grid.

The output of each of the input devices 6 is combined in, and passed by conductor 27 to the delay line 28 which in the present embodiment has a delay value of 0.2 microsecond and then applied through conductor 30 to the grid 31 of the control devices 10. Thus the first pulse appearing at any of the input terminals of the respective channels 1 through 4, is passed through delay line 28 to the grids 31 and thereby fixes the "resolving" time of the entire system inasmuch as the signal derived from such a pulse in input devices 6 and passed through the said delay line is sufficient to cut off control devices 10 when applied to the said grid 31. Thus, also, the application of a pulse to one of the input terminals after the appearance of the first pulse at grids 31 will not pass to the output circuit of said channel and the non-occurrence of the event represented by such a pulse within the predetermined "resolving" time of the system is thus evidenced by the inactive state of the output circuit indicator. However, during the interval in which grid 31 has not received a deactivating signal through delay line 28 each of said channels is in condition to pass the original pulse applied to cathode 14 of said channel through conductor 32 to capacitors 18 and charge the same. The resulting signal appearing at grid 16 causes output devices 11 to cease conducting thus stopping current flow through the winding of relay 12 and permit movable arm 23 to be pulled into contact with contact point 25. Current flow through neon indicating devices 13 is thus permitted, thereby sensibly indicating the passage of a pulse through a particular channel within the predetermined time period. In like manner the occurrence of the event under observation within a fixed time period with respect to the other events under observation is indicated.

It should be noted in this connection that resistor 29 in the grid return circuit of control devices 10 should be chosen so that the time constant of this circuit is such as to eliminate the possibility of the passage by control devices 10 of a pulse occurring at the time after the predetermined "resolving" time of the system. Preferably, resistor 29 should be chosen so that the inactive time of control devices 10 is at least a thousand times the delay time of delay line 28.

After the examination of a particular group of events and the indication of the occurrence or non-occurrence of the same within the predetermined time period by neon indicators 13 the system can be reset to its initial condition by momentarily depressing reset switch 21 thus causing anode potential to be applied to output devices 11 and resetting relay 12 so that movable arm 23 is in contact with contact point 24 and thus also returning neon indicators 13 to their unlit condition.

It will thus be seen that what has been described is a plural channel system for determining the occurrence or non-occurrence of events under observation within a predetermined time, which time is independent of the variability of characteristics of the system components. Obviously many variations will present themselves to one skilled in the art, for example, in place of the output devices 11 and relay 12 a "Sensitrol" type relay may be provided in the plate circuit of control devices 10 in such a manner that the said relay would operate as a ballistic galvanometer. Furthermore, although particular types of electron discharge devices have been shown and described, other devices may be employed, for example, in place of dual triode devices 6 and 10 other devices having suitable characteristics may be substituted. Similarly in place of output devices 11 a thyratron tube may be arranged so that the output of control devices 10 would fire the thyratron and light a neon indicator in parallel with the anode load resistor of said thyratron. In a like manner, a positive input pulse could be passed by the system by the provision of suitable polarity inverting devices interposed between the control devices 10 and output device 12. It is therefore apparent that no limitations should be placed on the scope of the present invention except as may appear in the appended claims.

What is claimed is:

1. An electronic system for indicating the occurrence of a plurality of electrically detectable events within predetermined time intervals comprising separate input means electrically associated with the events under observation, an electronic channel associated with each input means including control means and indicating means, and timing means associated with each of said input means and said control means and adapted to derive a signal from said input means and apply the same after a predetermined time to said control means to effect deactivation of each of said channels.

2. An electronic system for indicating the occurrence of a plurality of electrically detectable events within predetermined time intervals comprising separate input means electrically associated with the events under observation, an electronic channel associated with each input means including control means and indicating means, timing means associated with each of said input means and said control means and adapted to derive a signal from said input means and apply the same after a predetermined time to said control means to effect deactivation of each of said channels, and means for resetting said system to its initial condition after the observation of each group of events.

3. An electronic system for indicating the occurrence of a plurality of electrically detectable events within predetermined time intervals comprising separate input means electrically associated with the events under observation, an electronic channel associated with each input means including control means and indicating means, and timing means associated with each of said input means and said control means and adapted to derive a signal from said input means and apply the same after a predetermined time to said control means to effect deactivation of each of said channels for an extended time period.

4. An electronic circuit for indicating the occurrence of a plurality of electrically detectable events within predetermined time intervals comprising a plurality of electronic channels at least corresponding in number to the number of events under observation, each of said channels including an input circuit, an output circuit including sensible indicating means and control means connected therebetween responsive to a predetermined signal to prevent activation of said output circuit, and circuit means including delay means associating all of said input circuits and all said control means and adapted to derive a signal from at least the first input pulse and pass the same to said control means to deactivate the same.

5. An electronic circuit for indicating the occurrence of a plurality of electrically detectable events within predetermined time intervals comprising a plurality of electronic channels at least corresponding in number to the number of events under observation, each of said channels including an input circuit, an output circuit including sensible indicating means and control means connected therebetween responsive to a predetermined signal to prevent activation of said output circuit, circuit means including delay means associating all of said input circuits and all said control means and adapted to derive a signal from at least the first input pulse and pass the same to said control means to deactivate the same, and means for resetting said system to its initial condition after the observation of each group of events.

6. In a system of the character described, the combination of a plurality of electronic channels each comprising input terminals, a first signal responsive device, a control electron discharge device having at least anode, cathode and control electrodes and an output signal responsive device having at least an input terminal and an output circuit including sensible indicating means, common signal delay means having an input and an output terminal, means connecting each of said first signal responsive devices in series between said first mentioned input terminals and the input terminals of said delay means, means connecting the control device in each respective channel in series between the respective channel first memtioned input terminals and the respective channel input terminal of said output device, and means connecting the output terminal of said delay means with the control electrode of each of said control devices.

7. The system of claim 6 in which said first signal responsive unidirectional current conductive device is a diode type vacuum tube.

8. In a system of the character described, the combination of a plurality of electronic channels each comprising input terminals, a first signal responsive device, a control electron discharge device having at least anode, cathode and control electrodes and an output signal responsive device having at least an input terminal and an output circuit including sensible indicating means, common signal delay means having an input and an output terminal, means connecting the signal responsive device of each respective channel in series between the respective channel first mentioned input terminals and the input terminals of said delay means, means including signal attenuating means connecting the control device in each channel in series between the respective channel first mentioned input terminals and the respective channel input terminal of said output device, and means connecting the output terminal of said delay means with the control electrode of each of said control devices.

References Cited in the file of this patent

UNITED STATES PATENTS

| | | |
|---|---|---|
| 1,153,737 | Hoorn et al. | Sept. 14, 1915 |
| 1,887,684 | Huizinga | Nov. 15, 1932 |
| 2,285,556 | Batten | June 9, 1942 |
| 2,329,048 | Hullegard | Sept. 7, 1943 |